US008988995B2

(12) United States Patent
Fullarton et al.

(10) Patent No.: US 8,988,995 B2
(45) Date of Patent: Mar. 24, 2015

(54) NETWORK TRAFFIC MANAGEMENT

(75) Inventors: Sonya Fullarton, Ottawa (CA); Mohamad Mezher Hamzeh, Kanata (CA); Dennis Deans, Kanata (CA); Peter Blatherwick, Ottawa (CA); David Speirs, Nepean (CA)

(73) Assignee: Mitel Network Corporation, Ottawa, Ontario (CA)

( * ) Notice: Subject to any disclaimer, the term of this patent is extended or adjusted under 35 U.S.C. 154(b) by 654 days.

(21) Appl. No.: 11/781,352

(22) Filed: Jul. 23, 2007

(65) Prior Publication Data

US 2009/0028161 A1 Jan. 29, 2009

(51) Int. Cl.
H04L 12/26 (2006.01)
H04L 12/24 (2006.01)
H04L 12/54 (2013.01)
H04L 12/911 (2013.01)
H04L 12/927 (2013.01)
H04L 29/06 (2006.01)

(52) U.S. Cl.
CPC .......... *H04L 41/0896* (2013.01); *H04L 41/145* (2013.01); *H04L 12/5695* (2013.01); *H04L 41/0893* (2013.01); *H04L 43/0882* (2013.01); *H04L 43/16* (2013.01); *H04L 47/74* (2013.01); *H04L 47/805* (2013.01); *H04L 47/821* (2013.01); *H04L 65/80* (2013.01)
USPC ............................ 370/230; 370/252; 709/223

(58) Field of Classification Search
None
See application file for complete search history.

(56) References Cited

U.S. PATENT DOCUMENTS 5,657,446 A * 8/1997 Pinard et al. ............... 379/90.01
5,867,496 A * 2/1999 Peres et al. .................... 370/376
6,449,251 B1 * 9/2002 Awadallah et al. ........... 370/229
(Continued)

FOREIGN PATENT DOCUMENTS

EP 1026867 A2 8/2000
WO WO 00/35130 6/2000

OTHER PUBLICATIONS

Rosenberg et al., RFC 3489 STUN-Simple Traversal of User Datagram Protocol (UDP) Through Network Address Translators (NATs), Network Working Group, Mar. 2003.
(Continued)

*Primary Examiner* — Timothy J Weidner

(57) ABSTRACT

One aspect of the specification is the use of a virtual entity to represent the bandwidth bottleneck point in a network. Areas of the network where bandwidth does not need to be managed can be modeled as zones. This model enables more flexibility as the virtual bottleneck point can represent a collection of components (e.g. routers), or a portion of a real component (e.g. a router could be represented by multiple virtual bottleneck points with different purposes.) This model can also allow a user to decide which points in their network should be managed, independent of the underlying data network infrastructure. These virtual entities can be placed between areas of the network, and configured with specific policies. Bandwidth usage across these virtual entities can be tracked and compared to the configured bandwidth limit available to the application at each bottleneck point. When the bandwidth available at the bottleneck point is fully utilized, additional calls can be blocked or rerouted. Policies can be applied to permit certain calls to proceed despite the fact that bandwidth is fully utilized, or to block certain calls when bandwidth usage is approaching the maximum level. Bandwidth management can be distributed or centralized with information shared throughout a distributed network.

8 Claims, 5 Drawing Sheets

(56) References Cited

U.S. PATENT DOCUMENTS

| | | | |
|---|---|---|---|
| 6,502,131 B1 * | 12/2002 | Vaid et al. | 709/224 |
| 7,062,548 B1 * | 6/2006 | Peres | 709/223 |
| 7,173,907 B1 * | 2/2007 | Weber et al. | 370/230 |
| 7,185,077 B1 * | 2/2007 | O'Toole et al. | 370/254 |
| 7,222,345 B2 * | 5/2007 | Gray et al. | 709/226 |
| 7,330,832 B1 * | 2/2008 | Gray et al. | 709/226 |
| 7,502,329 B2 * | 3/2009 | Li et al. | 370/252 |
| 7,843,907 B1 * | 11/2010 | Abou-Emara et al. | 370/386 |
| 7,990,994 B1 * | 8/2011 | Yeh et al. | 370/431 |
| 2002/0101826 A1 | 8/2002 | Giacopelli et al. | |
| 2003/0028641 A1 * | 2/2003 | Zhang et al. | 709/226 |
| 2003/0101284 A1 * | 5/2003 | Cabrera et al. | 709/313 |
| 2003/0235187 A1 * | 12/2003 | Iwama et al. | 370/352 |
| 2004/0001511 A1 * | 1/2004 | Matta | 370/468 |
| 2005/0063307 A1 * | 3/2005 | Samuels et al. | 370/235 |
| 2005/0100049 A1 * | 5/2005 | Siminoff | 370/473 |
| 2005/0114541 A1 * | 5/2005 | Ghetie et al. | 709/232 |
| 2005/0125517 A1 | 6/2005 | Norrgard et al. | |
| 2006/0187836 A1 * | 8/2006 | Frey et al. | 370/235 |
| 2006/0262786 A1 * | 11/2006 | Shimizu et al. | 370/389 |
| 2006/0291477 A1 * | 12/2006 | Croak et al. | 370/395.51 |
| 2007/0002897 A1 * | 1/2007 | Goshen et al. | 370/468 |
| 2007/0025249 A1 * | 2/2007 | Yeom | 370/230 |
| 2007/0076601 A1 * | 4/2007 | Wang et al. | 370/229 |
| 2007/0147346 A1 * | 6/2007 | Gilmartin | 370/352 |
| 2008/0049628 A1 * | 2/2008 | Bugenhagen | 370/244 |
| 2009/0003194 A1 * | 1/2009 | Schelen et al. | 370/218 |

OTHER PUBLICATIONS

Petrie et al., A Framework for SEssion Initiation Protocol User Agent Profile Delivery, SIPPING, The IETF Trust (May 2007).

* cited by examiner

NETWORK TRAFFIC MANAGEMENT

RELATED APPLICATION DATA

This application is related to application Ser. No. 11/781,345 titled "Distributed Network Management", and Ser. No. 11/781,319 titled, "Configuration of IP Telephony and Other Systems", filed on Jul. 23, 2007. The contents of the above cited applications are incorporated by reference herein.

FIELD

The present specification relates generally to networking and more specifically relates to a network traffic management

BACKGROUND

Network bandwidth management of media streaming applications, such as voice, video, music, instant messaging and other (near) real time applications is an evolving art.

Many devices on the network may share a link via a router with limited bandwidth, but the individual devices have no visibility on what is happening on the other devices. This link (which can be logically considered as a fixed bandwidth pipe connecting different parts of the network that acts as a bottleneck point.) and possibly other aspects of the underlying data network, can become "bottleneck points" which must be managed as a scarce, shared resource across many devices.

Managing network traffic can be effected where the devices on the network all originate from a single manufacturer and can therefore be configured to cooperate with each other. However, it is uncommon and rarely practical to have a network where all devices originate from a single vendor, and do not have the same capabilities.

Network bandwidth management can be effected by blind bandwidth reservation for various devices, but this can lead to unused bandwidth.

Attempts to manage network bandwidth in IP telephony applications can be based on predicting the path that the media will follow based solely on the destination telephone number. However, features such as call forwarding, forwarding to voice mail, call pickup, and line appearances on other phones imply that the original destination number and primary phone may not be represent the endpoint that will ultimately be connected in the call.

Accounting of bandwidth needs for only the primary destination path would therefore miss many likely cases (calls that should have been blocked may not be), whereas accounting for all possible paths would be quite pessimistic (calls that should have been allowed, including other calls in progress at the same time, may be unnecessarily blocked).

The current bandwidth management capabilities of Unified Communication Solutions are generally limited to the counting of calls of routes programmed between two or more systems in an IP network. The aggregate bandwidth usage across multiple routes is not controlled nor is the bandwidth consumed to remote IP phone users accounted for. A known alternative is for the call controllers or the endpoints themselves to interact directly with the network infrastructure, for example extracting current bandwidth utilized from IP routers on the predicted media path. Since there are few well agreed standards-based interfaces to extract such information, and there is large variance between vendors, such an approach necessarily creates a number of undesirable assumptions and deployment constraints, making a practical multi-vendor solution difficult. Since multiple network elements may need to be queried for any particular flow, there would also be considerable messaging traffic at call setup time to be able to make any determination. Also, since network infrastructure does not generally have knowledge of the meaning of the traffic it carries, it is not possible to determine bandwidth used for any particular application and thus use this information to manage that application's usage.

Another known alternative is for the end devices to negotiate bandwidth resources directly with the network infrastructure, for example using Resource Reservation Protocol (RSVP), (as described in Braden et al., Resource ReSerVation Protocol (RSVP) Version 1 Functional Specification Network Working Group, IETF Request for Comments 2205, http://www.ieff.org/rfc/rfc2205.txt)). However these techniques add considerable complexity to deployment, and require RSVP-aware network elements be in place across all parts of the network where call media would potentially flow. The latter assumption adds large costs, and is not feasible in the general case of arbitrary pairs of endpoints involved in the flows (which is fundamental to VoIP applications.

It is desirable to obviate or mitigate at least one of the above-described disadvantages, and in any event to provide a novel network traffic management infrastructure.

SUMMARY

One aspect of the specification is the use of a virtual entity to represent the bandwidth bottleneck point in a network. Areas of the network where bandwidth does not need to be managed can be modeled as zones. This model enables more flexibility as the virtual bottleneck point can represent a collection of components (e.g. routers), or a portion of a real component (e.g. a router could be represented by multiple virtual bottleneck points with different purposes.) This model can also allow a user to decide which points in their network should be managed, independent of the underlying data network infrastructure. The focus is on bandwidth usage by a specific application. These virtual entities can be placed between areas of the network, and configured with specific policies. Bandwidth usage across these virtual entities can be tracked and compared to the configured bandwidth limit available to the application at each bottleneck point. When the bandwidth available at the bottleneck point is fully utilized, additional calls can be blocked or rerouted. Policies can be applied to permit certain calls to proceed despite the fact that bandwidth is fully utilized, or to block certain calls when bandwidth usage is approaching the maximum level. Bandwidth management can be distributed or centralized with information shared throughout a distributed network.

Another aspect of the specification is a method of managing bandwidth within a high bandwidth area where the media stream routes through a media anchor point such as a Session Border Controller.

Another aspect of the specification provides a decision point for a new call (or other usage of bandwidth) where the bandwidth available is checked, and a decision is made on how to handle the call if not enough bandwidth is available. Once the bandwidth in use at a bottleneck point reaches the maximum, additional calls through that bottleneck point should be blocked, through the process of "Call Admission Control" (CAC). Calls can be admitted once enough bandwidth is available for another call. Call Admission Control need not be applied for some calls, such as emergency calls, and this specification provides a policy engine that can be applied to handle exceptional situations.

Another aspect of the specification can, in certain configurations, allow an administrator to identify the bottleneck points in the system where bandwidth may be managed, and to control how much bandwidth can be used by the application at these bottleneck points.

Another aspect of the specification can provide a method of modeling a network, and the path through the bottleneck points from one part of the network to another.

Another aspect of the present specification includes identifying bottleneck points throughout a data network and modeling each bottleneck point as a virtual entity called a Zone Transit Point (ZTP). The bottleneck points exist between zones in the network, and each one is identified and configured with the maximum bandwidth available for the application. Within a zone, there is no need to manage bandwidth usage. A zone would typically consist of a single site, or a local area network ("LAN") shared by a number of devices. Individual devices and gateways capable of streaming media have a zone identifier representing the zone in which they are located. The path from any one zone to any other zone in the system is known, as are the ZTPs that will be traversed. As a media stream is established, the zone of the media endpoints can determine the bottlenecks points that have been traversed, and are counted. A media anchor point (such as a session border controller) can also be modeled as a ZTP. The call signaling path is not considered in determining the bandwidth usage. Before a call is presented, the path that the media will take and the available bandwidth along that path is considered, and call admission control policies determine whether the call is allowed to proceed.

The present specification can be applied to bandwidth management in Unified Communications, iPBX's, other voice solutions, as well as any applications that use bandwidth, and are required to limit bandwidth usage at particular points in the network.

The abstraction of the network with lower bandwidth points in between high bandwidth areas can be used to illustrate the general topology of the network, where devices are located, and the path that most traffic takes between sites. Statistics on traffic flow, peaks, type of data, origination and destination of data can be kept for specific applications allowing better tuning of the network usage.

The identified virtual bottleneck points can be used to track and control more than total bandwidth usage. For example, identified virtual bottleneck points could be used to compare bandwidth used for voice, data, video, signaling, etc. at specific points in the network. Identified virtual bottleneck points can also be used to track other limited resource usage.

The identification of the group of devices that can communicate with each other without concern for bandwidth usage can be used to optimize other information sharing. Information can be shared freely within the zone, but should be optimized across zone boundaries. The identified virtual bottleneck points can be used to control other forms of data transfer, and to collect statistical information on the amount of data crossing between sections of the network.

DETAILED DESCRIPTION OF THE EMBODIMENTS

Figure 1:
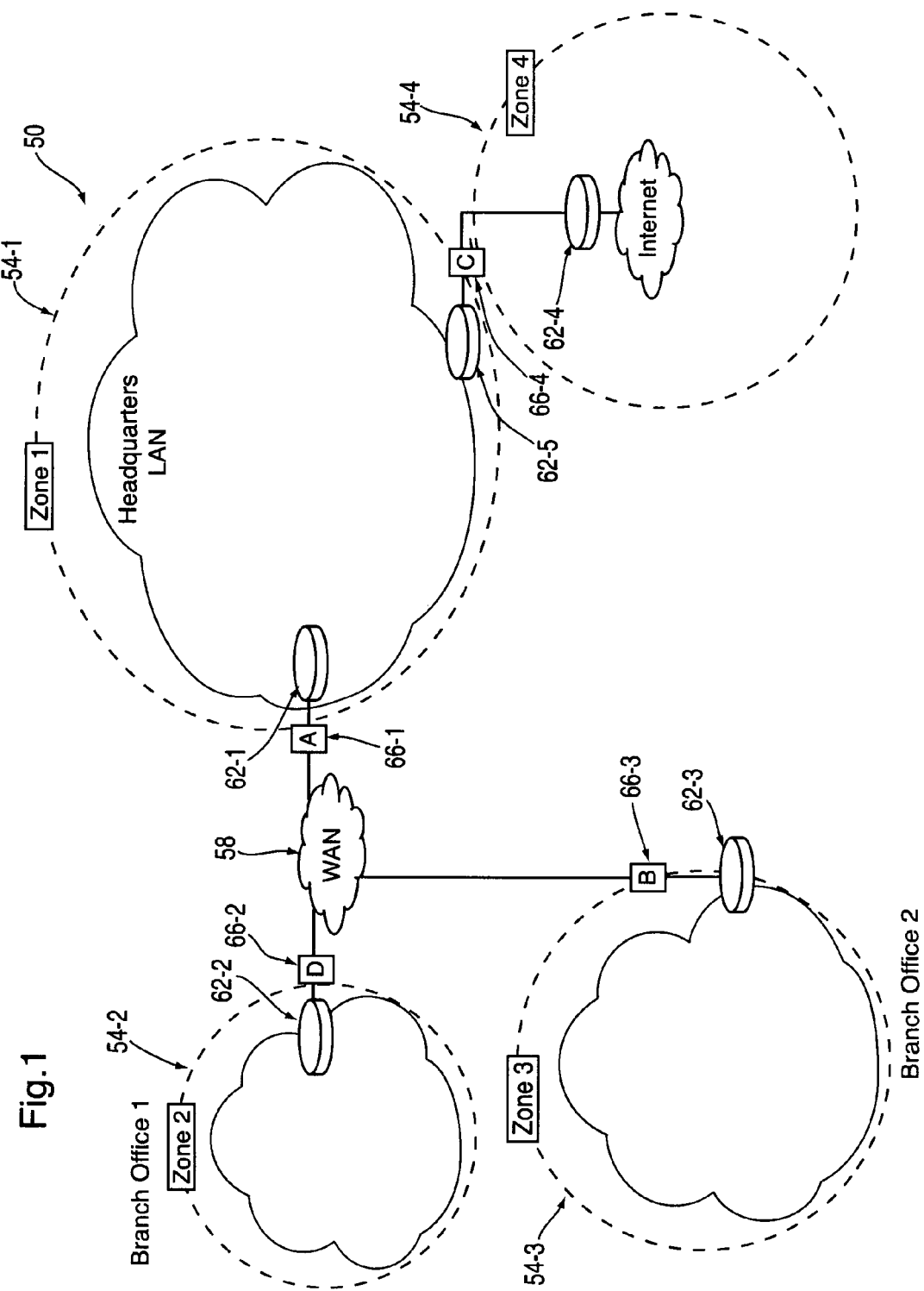
FIG. 1 is a diagram of a data network comprising of LAN segments connected via a WAN.

With reference to FIG. 1, a data network is indicated generally at 50. Data network 50 is represented as a plurality of network segments that can be considered high bandwidth islands where there is no need to monitor bandwidth usage within these segments. Each network segment is identified as a zone 54-1, 54-2, 54-3, 54-4 (Collectively, zones 54, and generically, zone 54. This nomenclature is used elsewhere herein). Zones 54 are related to the physical network topology and are often related to physical site location as well. For example, data network 50 represents a network topology associated with an enterprise that has a headquarters and two branch offices. Zone 54-1 represents the local area network (LAN) at the headquarters. Zone 54-2 represents the LAN at a first branch office. Zone 54-3 represents the LAN at a second branch office. Zone 54-4 represents the Internet 60 itself.

Zone 54-1, 54-2 and 54-3 are interconnected via a wide area network (WAN) 58. (Note that WAN 58 can be (but need not be) implemented via the Internet 60, but it is still convenient to draw WAN 58 as logically separate from zone 4 and Internet 60). Points in network 50 where it can be desired to manage bandwidth exist at "bottleneck points" between zones 54. Exemplary bottleneck points are shown in FIG. 1 as routers 62. Routers 62 are thus modeled as bottleneck points, but it should be understood that model bottleneck points can be placed at any point in network 50 where bandwidth management is desirable. Each bandwidth link between each zone 54 is referred to herein as a zone transit point 66. Network 50 can thus be viewed as a collection of zones 54 interconnected with a plurality of zone transit points 66. In such a view of network 50, there is no need for a direct correlation between devices operating within network 50.

In traditional time-division-multiplexed ("TDM") telephony, media and call signaling flow along the same path defined by the physical connections and routing algorithms. With Internet Protocol ("IP") based communications, the call signaling path can be very different from the path the media travels through the network. Voice, music and video streams are examples of media. It is the media path that is generally most important for bandwidth management in communication systems as media consumes more bandwidth than call signaling, and the path the media will follow between any two zones in the network has to be known. The path of the media can be described by zone transit points 66 along the media path between endpoints in two different zones 54. There can be any number (i.e. zero or more) of zone transit points 66 along the path. For example, in FIG. 1 the path between Zone 54-2 and Zone 54-4 includes zone transit points 66-2, 66-1 and 66-3. According to a present embodiment, by determining the optimum path from one zone 54 to any other zone 54 through the zone transit points 66, it is possible to manage the amount of bandwidth in use at any given time for voice, or other media types, through the identified bottlenecks, which in this case are routers 62.

Figure 2:
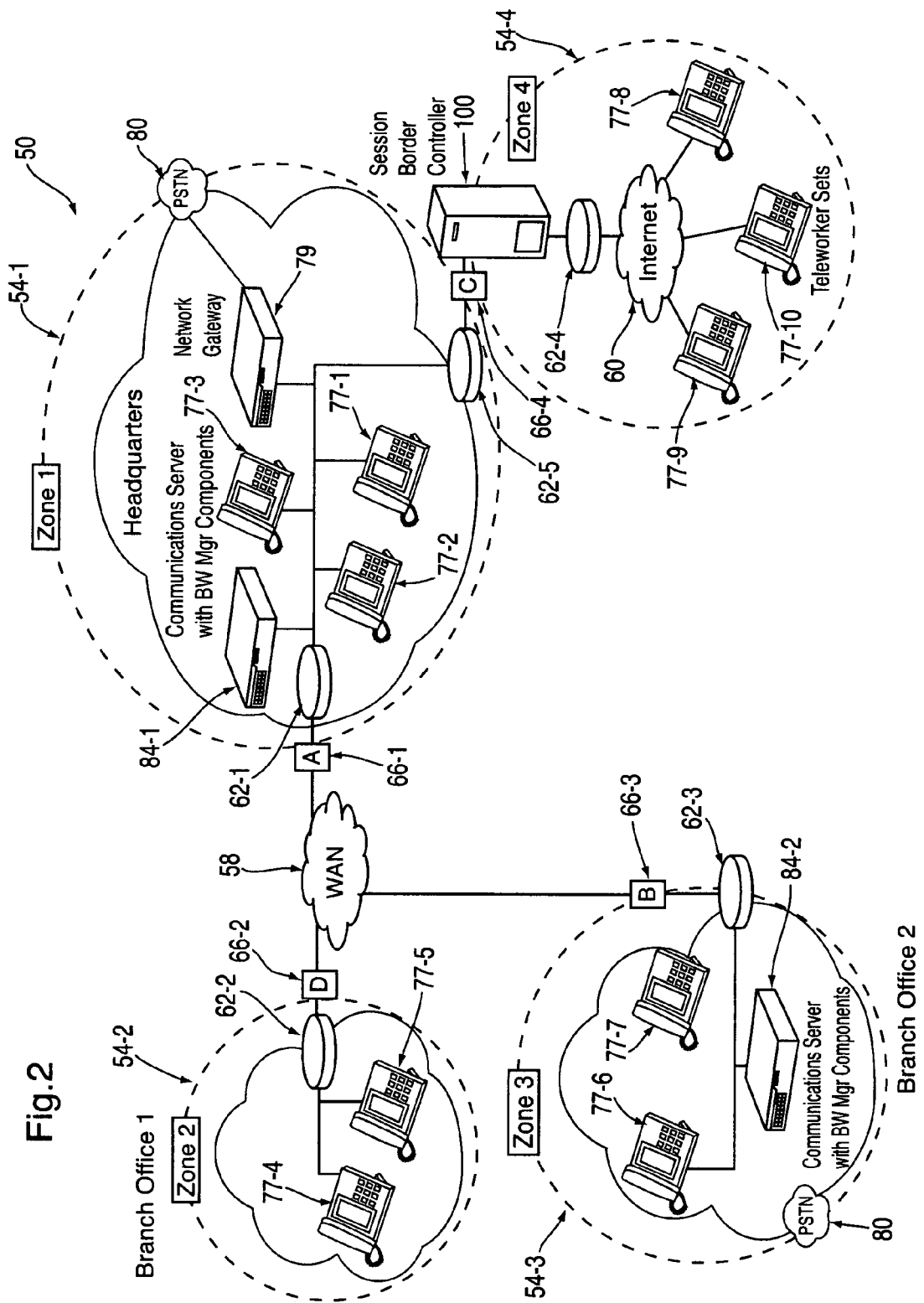
FIG. 2 illustrates the communication devices of the data network of FIG. 1 in greater detail.

FIG. 2 shows the network 50 of FIG. 1, but also includes exemplary devices 77 and 79 within network 50. Devices 77 and 79 in a present embodiment include phones and network gateways. Devices in other embodiments can also include media gateways, video game consoles and any other device that may carry media over a network.

Zone 54-1 includes three IP telephone devices 77-1, 77-2 and 77-3 and a network gateway device 79 that connects telephone devices 77-1 through 77-3 to the public switched telephone network ("PSTN") 80 so that telephones 77-1 through 77-3 can conduct traditional PSTN telephone calls.

Zone 54-2 includes two IP telephone devices 77-4 and 77-5. Those skilled in the art will recognize that telephone devices 77-4 and 77-5 will need to use gateway device 79 to conduct calls over PSTN 80, and such PSTN communications will need to be carried via zone transit points 66-1 and 66-2.

Zone 54-3 includes two IP telephone devices 77-6 and 77-7.

Zone 54-4 includes three IP telephone devices 77-8, 77-9 and 77-10 that connect directly to the Internet 60.

Devices 77 in zones 54-3 and 54-4 can also be configured use network gateway 79 to access the PSTN 80 in some cases, if desired. Indeed, any device 77 in network 50 can be configured to use network gateway 79 to access PSTN 80.

Each device 77 and 79, including phones and gateways, is thus associated with its own zone 54. A zone identifier is thus an attribute that is associated with each device 77 and 79. If a device 77 or 79 is moved to a different zone within network 50, then its zone identifier will also change.

Devices that are based on time-division-multiplexing ("TDM") (Not shown) (TDM device) as associated with the traditional PSTN 80 can be configured to have their own virtual zone (not shown) attached to gateway 79 since gateway 79 terminates the IP media stream. In other words, the trunk from gateway 79 to PSTN 80 could be considered as a virtual device with a virtual zone ID. A call from a device 77 to a TDM device on PSTN 80 is not usually directed at gateway 79, but that call will still traverse a gateway 79 because one party in the call is on a TDM device, and the media will be converted from TDM to IP to reach the other party on the device 77. The bandwidth used by the TDM part of the path need not be considered, so the IP media path will be deemed to terminate at the gateway 79 and the device 77. Since the media stream is deemed to be between an IP device 77 and gateway 79, then, for example, the zones of the IP device 77 and gateway 79 can be used in the determination of the path that the media followed. In this manner, the teachings herein can be applied to media that is also sent to PSTN 80.

The zone 54 associated with a particular device 77 can be configured, or can be determined automatically, by using the IP address and subnet mask of that particular device 77. Zones 54 can be associated with particular subnets.

Network 50 can thus be modeled as a series of zones 54 interconnected with zone transit points 66 in a tree structure. For the network configuration, each branch zone (i.e. zones 54-2 and 54-3) references a parent zone (i.e. zone 54-1), and any zone transit points 66 between the two zones 54. This allows network 50 to be described by a series of zone pairs. In order to determine the path between any two zones 54, one can walk the tree to a common node. Any zone transit points 66 on the route are in the media path between these zones. The tree can be expanded to provide a list of zone transit points 66 in the path for each pair of zones 54.

Using this tree model for network 54, the information on what zone transit points 66 are in the path of any connection, and the information on the nature and location of each device 77, it is possible to determine what zone transit points 66 will be included in bandwidth calculations for any communication. For example, if phone device 77-4 in Zone 54-2 answers a call from a phone device 77-1 in zone 54-1, then the bandwidth usage across zone transit points 66-1 and 66-2 will be increased. The actual amount of bandwidth used for the connection is dependent on the codecs, packet size, etc. that are negotiated for the connection. When the call terminates, the bandwidth in use across zone transit points 66-1 and 66-2 will be decreased by the same amount. If the connection details change during the call, for example changing to a different codec, or adding video, then the bandwidth usage will reflect the change. Normally, bandwidth usage and bandwidth consumed would be expressed in units of data/time (KBits/sec). Alternatively, the bandwidth limit at a zone transit point 66 can be expressed in number of active calls. Each call can be treated as equivalent, or calls with different codecs, etc. could be treated as a call multiple.

The foregoing can be effected with a bandwidth manager component, represented as a communication server 84-1 in zone 54-1. (Note that a communication server 84-2 is also included in zone 54-3. Communication server 84-2 combines the functionality of communication server 84-1 with gateway 79)

Figure 3:
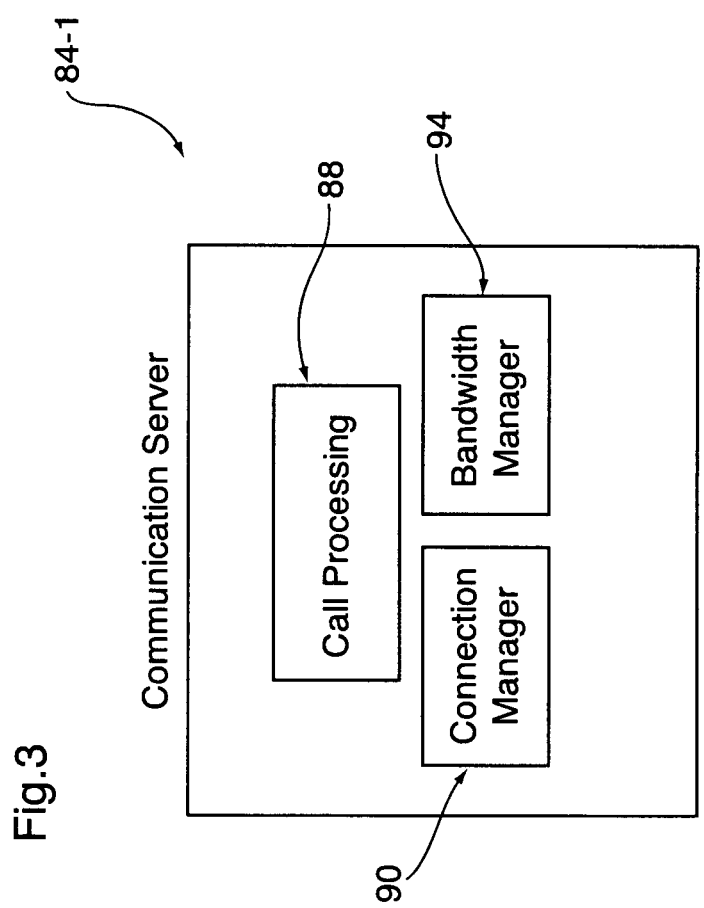
FIG. 3 illustrates the communication server of the data network of FIG. 1 in greater detail.
Figure 4:
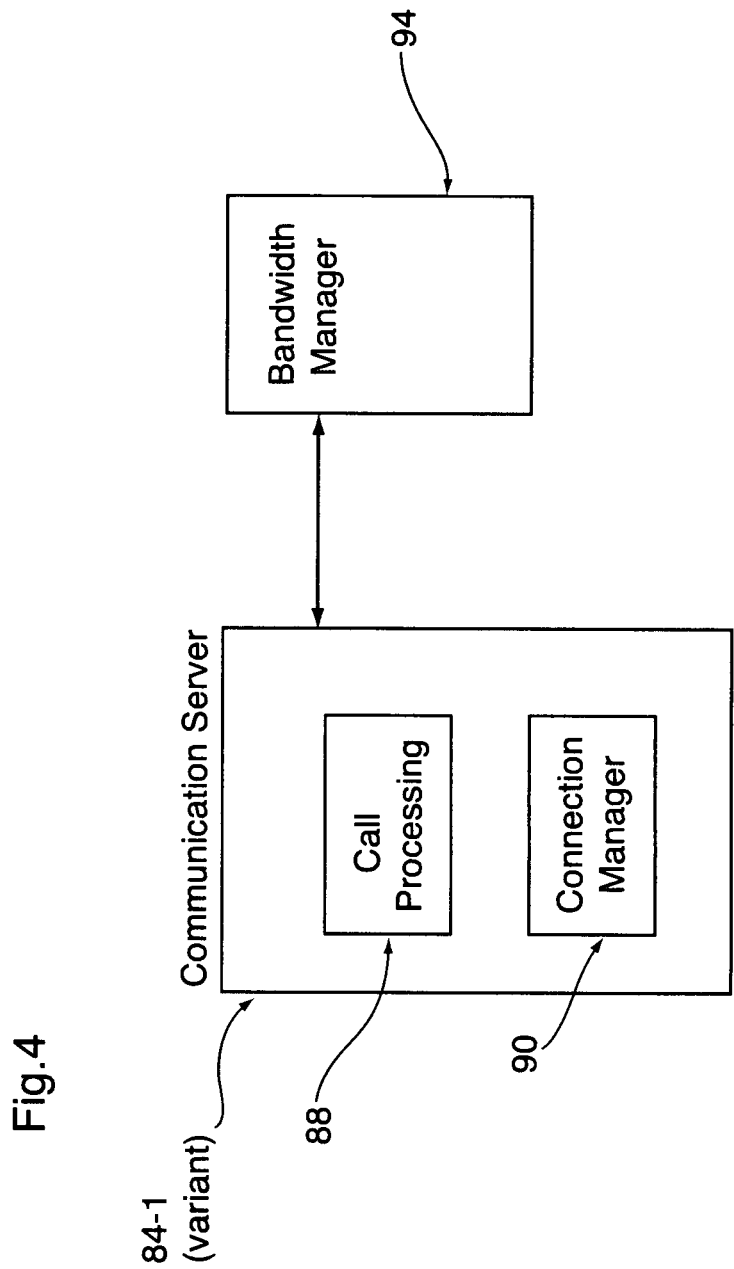
FIG. 4 illustrates the bandwidth manager configured separately from the communication server of FIG. 3.

In FIG. 3, the communication server 84-1 is shown in greater detail. Communication server 84-1 can be based on any desired computing environment that includes an appropriate hardware and software configuration including central processing unit(s), random access memory or other volatile storage, read only memory and/or disc storage or other non-volatile storage, network interfaces, and the like all interconnected by a bus and configured to execute an appropriate operating system and/or appropriate software and/or firmware to fulfill the functions described herein. (Such general configurations of computing environments are likewise applicable to the other components in network 50). Software and/or firmware on communication server 84-1 includes a call processing component 88, a connection manager 90, and a bandwidth manager 94. As the connection manager 90 connects or disconnects devices 77 in different zones 54, the connection information (e.g. summary of the amount of bandwidth consumed by the call, and the zones, or the raw information on zones, packet size, media types, codecs, etc.) is sent to bandwidth manager 94 which determines which zone transit points 66 are involved in the connection, and updates the total bandwidth usage for each zone transit points 66 that are involved. It should be noted that, as a variant, bandwidth manager 94 need not be physically co-existent with call processing component 88 and connection manager as shown in FIG. 4.

As previously discussed, a media path is established after an exchange of information between the originating endpoint (e.g. device 77-1) terminating endpoint (e.g. device 77-4) and their communication servers (e.g. server 84-1). The call signaling path, which is separate from the media path, is used to carry the information on IP address, port, codec, packet size, etc. There may be many communication servers 84 and gateways 79 along the signaling path, but the route that the media takes will typically be as direct as possible in accordance with the functions of the underlying infrastructure of network 50, and in any event may be quite different from any signaling paths. If two IP telephone devices 77 are in a call, and there is no gateway 79 in the path, the devices 77 will stream directly to each other regardless of the signaling path. For example, in a connection between device 77-1 and 77-2, media will stream directly to each other regardless of the signaling path between the devices 77-1 and 77-2. However, gateway 79 or other devices that terminate media streams may change the path that the media takes. For example, in a connection between device 77-1 and 77-4, router 62-1 and router 62-2 are along the path that the media takes through WAN 58. The actual application controlling the communication being carried does not control what routers 62 are involved in the media path, and has no visibility of them. But, by modeling zone transit points 66 one can predict which zone transit points 66 are between two endpoint devices 77, even if routers 62 are not managed by the communication application. Two IP phones devices 77 streaming to each other are considered to stream directly even if they pass through one or more routers 66 along the way. (Gateway 79 would change the path the media takes, but router 62 does not.) Thus, for example, for a call between device 77-1 and device 77-4, the stream is considered to be direct. The call passes through respective routers 62 because that is the only way to stream between those endpoint devices 77. By modeling routers 62 as zone transit points 66 one can predict that bandwidth has been consumed at those routers 62, but the path is not changed by routers 62.

It is also possible to configure bandwidth limits at each zone transit point 66 in order to provide Call Admission Control based on available bandwidth. Bandwidth Manager 94 can be configured to permit a predefined number of simultaneous calls, or the total allowable bandwidth each zone transit port 66 should support. Once the bandwidth in use at a particular zone transit point 66 reaches the predefined maximum, additional calls through that zone transit point 66 will be blocked. Calls will be admitted again through that zone transit point 66 once enough bandwidth is available for another call. Call Admission Control may not be applied for some calls such as emergency calls. Policies will be applied along with Call Admission Control to determine if the call can proceed and be presented to the destination device It is possible to tune the bandwidth limits at each zone transit point 66 by tracking the quality of service (QOS) of the voice calls across the zone transit point 66 using QOS statistics. If the voice quality is degrading before the bandwidth limit is reached, the bandwidth limit is most likely too high, and can be automatically tuned down by the bandwidth manager 94 and/or communication server 84.

The updating of data on communication server 84 reflecting the consumed amount of bandwidth can be carried out at call completion time (e.g. when the receiving device 77 is answered), but not during initial call setup (e.g. when the receiving device 77 is alerted.

Call processing component 88 is responsible for blocking a call before it is presented to the endpoint device 77 (e.g. before ringing on a particular phone). This process is called Call Admission Control (CAC). Call processing component 88 will check the path between the device that is about to receive the call and the caller by providing this information to bandwidth manager 94, and request permission to proceed. Bandwidth manager 94 will check that none of the zone transit points 66 on the path are saturated, and will advise call processing component 88 of that status.

An alternative method of call admission control is for the bandwidth manager 94 to announce, by broadcast messaging, multicast, or a directed interface status of zone transit points 66 to all applicable call processing components 88 in the network 50. When a particular zone transit point 66 changes status (becomes full, or become available again after being full) bandwidth manager 94 can announce this status change to call processing component 88. Call processing component 88 stores this status information for all zone transit points 66 of interest, to be applied in CAC of future calls. Call processing component 88 then makes use of this information in applying CAC to new calls, without need for specific query of the bandwidth manager(s) at call setup time.

In either interaction method, if any of the zone transit points 66 are saturated or otherwise currently blocked, then call processing component 88 can try to find an alternative route around the blocked zone transit point 66—possibly using a TDM route. If no alternative route is available, the call will be treated as busy to the calling device 77.

Note that some calls may be simultaneously addressed to multiple devices 77, such as shared line appearances or hunt groups. In these cases, each potential call leg is checked individually by call processing component 88, and admission control is applied separately for each. Hence blockage on one or more leg (i.e. a particular selected path between the devices 77 that are in question) can result in the destination device(s) 77 not being alerted, whereas other (non-blocked) destination device(s) 77 are still presented with the call.

As well, some calls can be presented in series, for example calling to voice mail as a result of Call Forward No Answer feature, or features that try to reach one number, and then try another number if the first is not answered. These calls are treated as new calls from the perspective of bandwidth accounting and admission control, including any possible simultaneous alerting as above.

As a further refinement on the above procedures, bandwidth manager 94 can also supply varying levels of bandwidth constraint to Call Control, to be applied in call handling. For example, the bandwidth manager 94 can report "blocked", "critical" or "non-blocked" status to Call Control. Call Control can then respond by blocking the call, enforcing the use of a low bandwidth codec, or allowing the call on the normal codec.

Bandwidth manager 94 can also keep statistics on bandwidth usage at each zone transit point 66, as well as number of blocked and permitted calls. Such statistics can be useful to management applications and to network planning, in order to assist in optimizing network design and for troubleshooting purposes.

Figure 5:
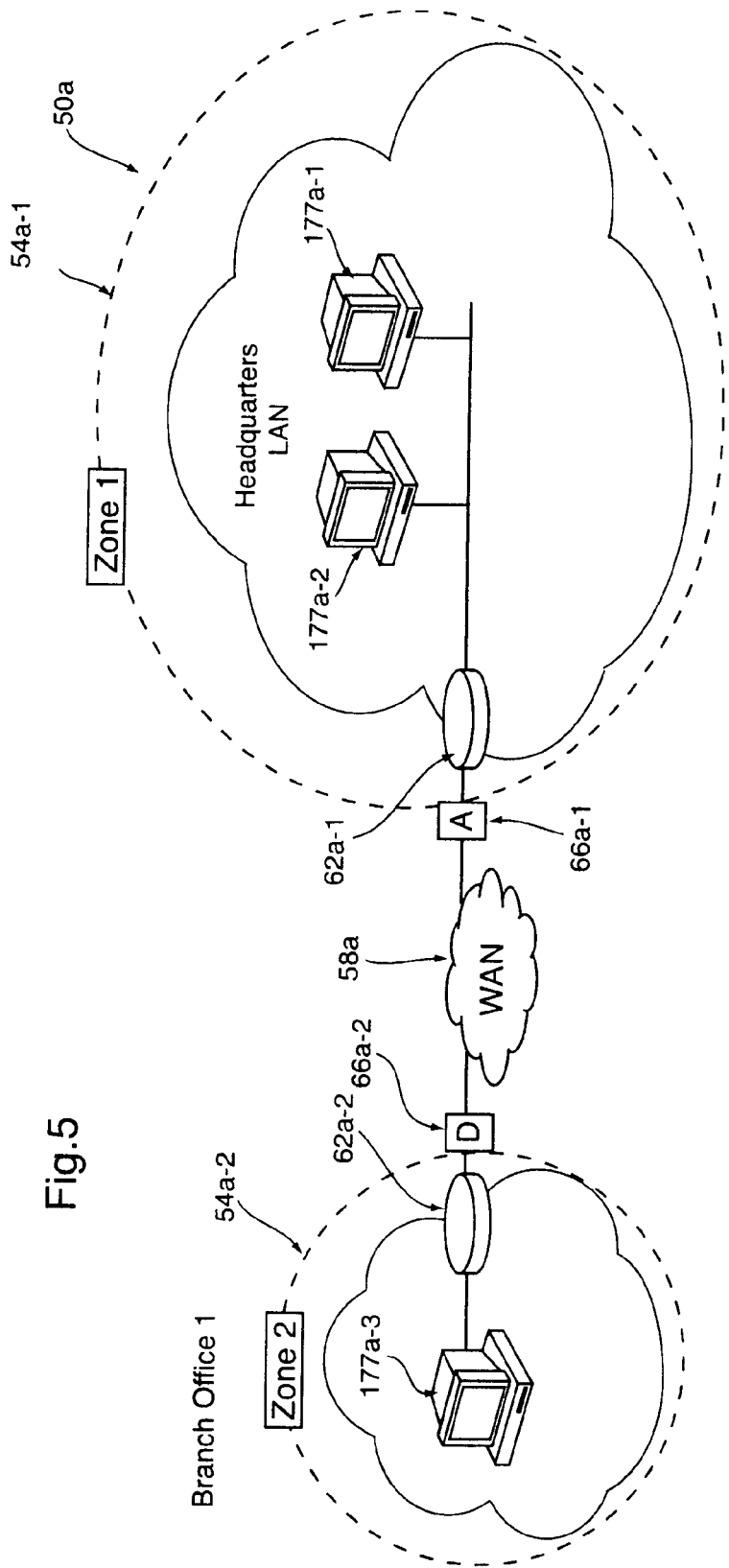
FIG. 5 is a diagram of a data network comprising of LAN segments connected via a WAN in accordance with another embodiment.

There are various options for managing bandwidth at individual zone transit points 66. For example, bandwidth manager 94 can be either centralized or distributed. Each zone transit point 66 will have a bandwidth manager 94 that is aggregating bandwidth usage for the particular bottleneck point, and a method of communicating the status to all communication servers 84. One bandwidth manager 94 can manage one, or many, or all zone transit points 66 within the overall network 50. In the event that a bandwidth manager 94 is not accessible, a different bandwidth manager 94 can take over the bandwidth management function for specific zone transit point 66. Each communication server 84 will know the zone transit points 66 along the path between any two zones 54, and which zone transit points 66 are currently saturated so that the call can be blocked by any communication server 84. Once a call is connected or disconnected, bandwidth manager(s) 94 of all zone transit points 66 in the media path can be updated by communication server(s) 84. Bandwidth manager(s) 94 each know which zone transit points 66 they are responsible for. The bandwidth in use is tracked independently for each zone transit point 66. Alternatively, communication server 84 can inform one bandwidth manager 94 of the call connection or disconnection, and zones 54 of the endpoint devices 77 (or gateways 79, if relevant) in the call. The designated bandwidth manager 94 will inform other bandwidth manager(s) 94 of the event. This information can be distributed using a broadcast or multicast mechanism, or by an interface directed at specific Bandwidth Managers. In this model, the communication server 84 does not need to be aware of all zone transit points 66 along the media path, as this responsibility is assumed by bandwidth manager 94. Multiple applications that generate different media streams could thus leverage bandwidth manager(s) 94. An example is shown in FIG. 5. FIG. 5 shows a variation on network 50 in the form of network 50*a*. Network 50*a* includes many of the same elements as network 50 and like elements bear like references except followed by the suffix a. Of note, instead of IP telephone devices 77, network 50*a* includes video streaming devices 177*a*. A video streaming application executing on devices 177*a* could also report the zones 54*a* of the sending and receiving devices 177*a* to the bandwidth manager 94 when the video streaming application starts and stops sending video, and the bandwidth manager 94 could track bandwidth used by multiple applications across zone transit points 66*a*. Another option for managing bandwidth at zone transit points 66 involves configuring each communication server 84 to independently manage individual zone transit points 66 based on calls through the communication servers 84. Each zone transit points 66 is assigned a bandwidth manager 94 that is associated with a communication server 84. As calls are connected, the bandwidth managers 94 check the zones 54 of the endpoint devices 77, and the path through the zones 54, and update bandwidth usage for any zone transit points 66 that it is managing. Every communication server 84 is configured to know zone transit points 66 along the path between any two zones 54.

Calls within a zone 54 do not normally consume bandwidth at any zone transit point 66. An exception is, however, calls that do not stream point-to-point, but instead stream through a middle point such as a session border controller 100. For example, a telephone device such as device 77-9 in the Internet 60 would stream back to session border controller 100, and session border controller 100 would stream to the other telephone phone, such as device 77-10, in the call. In order to count the bandwidth consumed through a zone transit point 66 (in this case, zone transit point 66-4) for calls within zone 54-4, zone 54-4 will be identified as a zone with a "media anchor point", in the form of session border controller 100. Also, a particular zone transit point (in this case, zone transit point 66-4) is identified as the bottleneck point for the media anchor point. Any calls between endpoint devices (i.e. device 77-9 and 77-10) within this type of zone (i.e. zone 54-4) is identified as bandwidth consumption associated with the particular zone transit point (i.e. zone transit point 66-4).

The present specification can be applied to a larger class of applications outside of VoIP. Any application that must manage consumed bandwidth across a complex network containing constrained bottleneck points may make use of constructs described here.

As previously discussed in relation to FIG. 4, bandwidth manager 94 can be abstracted from the communication server 84 and used as a common component by a number of co-located applications. Such separation can allow the user to configure the total bandwidth available at each point to be shared by applications, and allow the applications to handle the fact that bandwidth is not available in an application specific fashion.

While the foregoing discusses certain exemplary embodiments, it is to be understood that combinations, subsets and/or variations thereof are contemplated.

The invention claimed is:

1. A bandwidth manager comprising:
a computing environment that includes a central processing unit, volatile storage, non-volatile storage, a network interface, interconnected by a bus;
said computing environment being configured to an operating system;
said computing environment being configured to maintain data representative of a network;
said network having a plurality of zones wherein each zone includes at least one communication device, said network having at least one virtual zone transit point interconnecting each of said zones wherein each virtual zone transit point comprises a virtual entity modeling a network bottleneck point at which bandwidth usage is to be managed and that is outside of each of said zones and is independent of configuration of said network;
said data representative of said network comprising an identification of each of said zones and each of said zone transit points and a bandwidth capacity of each of said zone transit points wherein said bandwidth capacity is tracked by measuring an amount of bandwidth utilized at each of said zone transit points by counting a number of telephone calls being carried through each of said zone transit points; and
said computing environment being configured with admission control logic for determining whether to permit a communication between said devices within said network on the basis of said data,
wherein if connection details change during a call, the bandwidth usage is tracked by counting a call multiple for each change in bandwidth for the call connection.

2. The bandwidth manager of claim 1 wherein said communication is one of a telephone call, a streaming video application, a streaming audio application, an instant messaging application, and a facsimile transmission.

3. The bandwidth manager of claim 1 wherein said devices are within different ones of said zones and said communication is permitted if said transit points that are respective to said different ones of said zones has capacity.

4. The bandwidth manager of claim 1 wherein at least one zone includes at least two devices and said communication between said devices is always permitted.

5. The bandwidth manager of claim 1 wherein said admission control logic is configured to permit said communication if a predefined level of bandwidth is available at zone transit points identified for carrying said communication.

6. The bandwidth manager of claim 5 wherein said predefined level of bandwidth is configurable according to historical quality of service statistics gathered from previous communications.

7. The bandwidth manager of claim 1 wherein said computing environment is configured to reflect that bandwidth is consumed at the time a call is completed between said devices.

8. The bandwidth manager of claim 1 wherein each of said devices of each zone are configured to maintain a zone identifier that is based on an Internet protocol address of each said device and a subnet of each said device.

* * * * *